United States Patent
Vu et al.

(10) Patent No.: US 9,529,628 B2
(45) Date of Patent: Dec. 27, 2016

(54) BINARY EDITING OF APPLICATIONS EXECUTED BY VIRTUAL MACHINES

(71) Applicant: VMware, Inc., Palo Alto, CA (US)

(72) Inventors: Lan Vu, Denver, CO (US); Hari Sivaraman, Livermore, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 323 days.

(21) Appl. No.: 14/222,260

(22) Filed: Mar. 21, 2014

(65) Prior Publication Data

US 2015/0268978 A1    Sep. 24, 2015

(51) Int. Cl.
    *G06F 9/455*    (2006.01)
    *G06F 9/50*     (2006.01)
    *G06F 9/44*     (2006.01)

(52) U.S. Cl.
    CPC .............. *G06F 9/50* (2013.01); *G06F 9/45525* (2013.01); *G06F 9/4425* (2013.01)

(58) Field of Classification Search
    None
    See application file for complete search history.

(56) References Cited

U.S. PATENT DOCUMENTS

| | | | | |
|---|---|---|---|---|
| 2004/0237067 A1* | 11/2004 | Sun | ............................ | G06F 8/61 717/110 |
| 2006/0074989 A1* | 4/2006 | Laborczfalvi | ........... | G06F 9/443 |
| 2007/0094667 A1* | 4/2007 | Bissett | .................... | G06F 9/468 718/104 |
| 2009/0172662 A1* | 7/2009 | Liu | ...................... | G06F 9/44505 718/1 |
| 2010/0223613 A1* | 9/2010 | Schneider | ........... | G06F 9/45558 718/1 |
| 2011/0145643 A1* | 6/2011 | Kumar | .................. | G06F 11/263 714/33 |
| 2011/0197188 A1* | 8/2011 | Srinivasan | ................ | G06F 8/60 718/1 |
| 2014/0115292 A1* | 4/2014 | McLachlan | ............. | G06F 12/02 711/170 |
| 2015/0178054 A1* | 6/2015 | Delsart | ..................... | G06F 8/30 717/106 |
| 2015/0178113 A1* | 6/2015 | Dake | ................... | G06F 9/45558 718/1 |

* cited by examiner

Primary Examiner — Kenneth Tang

(57) ABSTRACT

Systems and techniques are described for modifying an executable file of an application and executing the application using the modified executable file. A described technique includes receiving, by a virtual machine, a request to perform an initial function of an application and an executable file for the application. The virtual machine modifies the executable file by redirecting the executable file to a custom runtime library that includes a custom function configured to initialize the application and to place the application in a paused state. A custom function call is added to the custom function in the executable file. The virtual machine initializes the application by executing the modified executable file, the executing causing the custom function to initialize the application and place the application in a paused state.

21 Claims, 4 Drawing Sheets

BINARY EDITING OF APPLICATIONS EXECUTED BY VIRTUAL MACHINES

BACKGROUND

This document relates to modifying executable files for applications that are executed by virtual machines.

A virtual machine (VM) is a software-based abstraction of a physical computer system. In general, a computer program that can be executed on a physical computer system can be executed in a VM using virtualization software. Virtualization software is software that is logically interposed and interfaces with a VM and a physical computer system. Each VM is configured to execute an operating system, referred to herein as a guest operating system (guest OS), and applications. A physical computer system, also referred to herein as a host machine, can execute one or more VMs.

SUMMARY

In general, one aspect of the subject matter described in this document can be embodied in a technique that includes receiving, by a virtual machine, a request to perform an initial function of an application and an executable file for the application, the application including one or more instructions for a particular programming platform; modifying, by the virtual machine, the executable file by: redirecting the executable file to a custom runtime library that is different from a standard runtime library for the particular programming platform, the custom runtime library including a custom function configured to initialize the application and to place the application in a paused state in response to a request to initialize the application; and adding, in the executable file, a custom function call to the custom function; and initializing, by the virtual machine, the application by executing the modified executable file, the executing causing the custom function to initialize the application and place the application in a paused state whereby the application waits for data specifying a one or more additional functions of the application to perform using the particular programming platform.

These and other aspects can optionally include one or more of the following features. Initializing the application can include performing the initial function using the particular programming platform and pausing the application after the initial function has been performed. Performing the initial function can include the virtual machine interacting with a hardware processing unit that is configured to execute function calls for the particular programming platform. The hardware processing unit can include a graphics processing unit (GPU) and wherein the particular programming platform is Compute Unified Device Architecture (CUDA).

Aspects can include receiving, by the virtual machine, data specifying a second function of the application to be performed; performing, by the virtual machine, the second function using the particular programming platform; providing, by the virtual machine, data related to the performed second function; and returning, by the virtual machine, the application to the paused state.

In some implementations, redirecting the executable file to a custom runtime library that is different from a standard runtime library for the particular programming platform includes identifying, in a dynamic linking information segment of the executable file, a reference to a standard runtime library for the particular programming platform; and modifying the reference to the standard runtime library to reference a custom runtime library.

Modifying the executable file can include identifying, in one or more symbol tables of the executable file, a reference to an application programming interface (API) function of the standard runtime library for the particular programming platform; modifying, in the one or more symbol tables, the reference to the API function to reference the custom function; identifying, in one or more relocation sections of the executable file, relocation information of the API function; and modifying a main function of the executable file to replace binary code of the main function by a function call to the custom function using the relocation information of the API function.

In some implementations, the received application includes at least one segment of user-created code that is different from standard API calls for the particular programming platform. In some implementations, the virtual machine receives the request and the executable file from a second virtual machine. The second virtual machine can execute the application; identify functions calls of the application that are for the particular programming platform; and provide data specifying the identified function calls to the virtual machine in response to identifying the identified function calls. In some implementations, the second virtual machine includes a client virtual machine and the virtual machine comprises an appliance virtual machine.

In some implementations, the virtual machine modifies, for each of a plurality of virtual machines, a respective second application that includes instructions that specify functions for the particular programming platform; and performs functions related to each second application that are requested by the plurality of virtual machines. In some implementations, the particular programming platform includes a Compute Unified Device Architecture (CUDA) programming platform.

Particular embodiments of the subject matter described in this document can be implemented so as to realize one or more of the following advantages. An application being executed by a client VM and that includes arbitrary or user-created code can be executed using an appliance VM without recompiling the application by directly editing the executable file of the application to perform similar tasks as would be performed by a recompiled application. Avoiding the requirement of recompiling the application by users of the client VM can improve the user experience. By using an appliance VM having modified versions of application executable files and that is communicably coupled to one or more processing units for a programming platform, multiple client VMs can send functions calls to the appliance VM to execute the function calls using the modified applications and the processing unit rather than each client VM being coupled to the processing unit and without recompiling each application. Having an appliance VM interact with the processing unit to execute functions for client VMs allows the client VMs to be less complex as the drivers and runtime libraries for the processing unit are installed on the appliance VM rather than on each client VM. Additionally, customized drivers are not required for the appliance VM as the appliance VM can use the stock driver of the processing unit. Client VMs executing on host machines that do not have the type of processing unit that the appliance VM has can execute applications that are specific to the type of processing unit by submitting requests to the appliance VM. The use of an appliance VM to execute application functions that require a particular processing unit allows for fewer VMs to be communicably coupled to the processing unit and for the client VMs to not need the appropriate drivers and other software for communicating with the processing unit.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
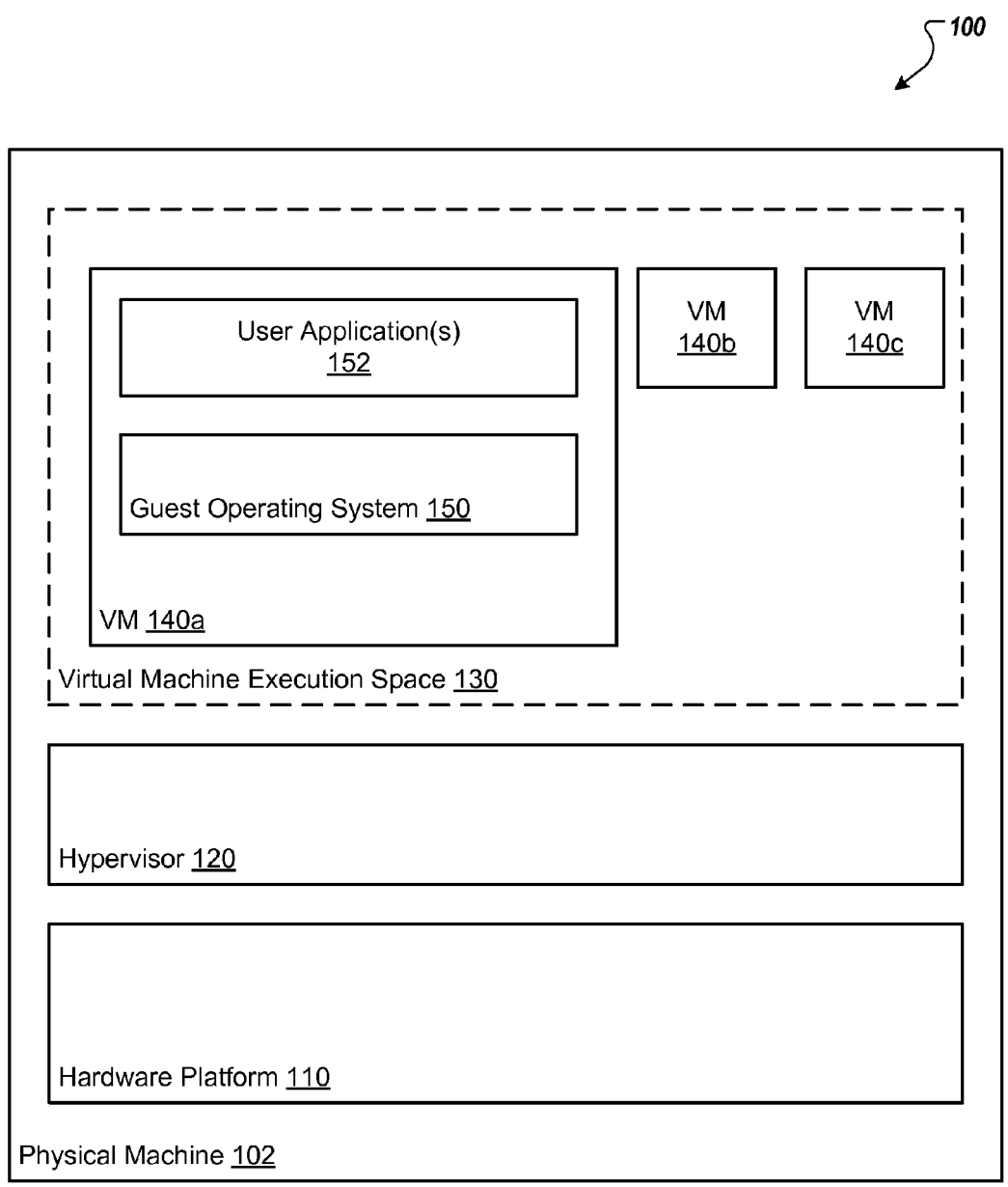
FIG. 1 shows an example environment of VMs.

This document generally describes techniques for modifying executable files for applications having custom code fragments so that a VM communicably coupled to one or more processing units for the application can execute function calls of the application, e.g., received from another VM, without recompiling the application at the VM coupled to the processing unit(s). An appliance VM may be communicably coupled to one or more processing units, e.g., one or more graphics processing units, to perform functions of applications written for execution by that type of processing unit or for a software platform that uses the type of processing unit to execute instructions. For example, the functions may be specific to the processing unit and client VMs may execute on a physical machine that does not have that kind of processing unit. The client VMs can submit, to the appliance VM, requests to complete functions using the processing unit. For example, a client VM may execute the application and, when the client VM encounters a function to be performed by the processing unit, it sends a request to the appliance VM to complete the function. The appliance VM can interact with the processing unit to complete the function and send data related to the performed function to the client VM for use in continuing the execution of the application.

For applications that include standard function calls, e.g., a set of standard application programming interface (API) calls, for a particular programming platform, a client VM can send to the appliance VM a request that includes data specifying the requested function and data related to the function, e.g., parameters or other data to be used in completing the function. The appliance VM can store data identifying the standard functions, e.g., in a runtime library for the particular programming platform. In response to receiving a request from a client VM, the appliance VM can identify the requested function in the runtime library and interact with the processing unit to complete the function.

Some programming platforms allow users to create custom code, e.g., custom code fragments, that can be performed by a processing unit for the programming platform. For example, the Compute Unified Device Architecture (CUDA) allows users to create custom code fragments that can be performed using a graphics processing unit (GPU). As these custom code fragments may not be included in the set of standard functions for the programming platform, the appliance VM should provide access to the custom code fragments.

As described below, the appliance VM may be configured to execute custom functions without recompiling the application by modifying the binary of the executable file. For example, the appliance VM may modify the executable file such that a custom runtime library is loaded into memory. The custom runtime library can include a custom function that causes the application to initialize and to be placed in a paused state in which the application waits for requests to perform functions rather than executing the application. When a request to complete a function is received, e.g., from a client VM executing the application, the appliance VM can execute the function, return data related to the function to the client VM, and return the application to the paused state until another request to complete a function is received.

FIG. 1 shows an example environment 100 of VMs. In the example environment 100, a physical machine 102 is configured to execute VMs 140a-140c using a hypervisor 120. The physical machine 102 is one or more data processing apparatus that each includes a hardware platform 110. The hardware platform 110 may include, e.g., a local storage device, a network adapter, memory, a processor, and so on.

The hypervisor 120 is a virtualization software layer that executes on the hardware platform 110. The hypervisor 120 manages a virtual machine execution space 130 within which one or more VMs 140a-140c may be concurrently instantiated and executed. Although three VM 140a-140c are illustrated in FIG. 1, the hypervisor 120 can manage other numbers of VMs. For each VM 140a-140c, the hypervisor 120 manages a corresponding virtual hardware platform. Each virtual hardware platform includes emulated hardware, e.g., a virtual storage device, a virtual network adapter/interface, virtual memory, a virtual processor, and so on.

Each VM managed by the hypervisor 120 executes a guest operating system, e.g., guest operating system 150, that executes user applications, e.g., user applications 152. The hypervisor 120 transforms input/output (I/O) requests from the guest operating systems to the corresponding virtual hardware platform into corresponding request to the hardware platform 110.

In some implementations, the hardware platform 110 may not include a particular processing unit necessary to execute instructions of a user application, e.g., the user application 152. For example, the application 152 may be a CUDA application and the hardware platform 110 may not include a GPU for the CUDA application. To execute CUDA functions of the application, the VM 140a may send requests to another VM, e.g., an appliance VM, that is hosted on a physical machine that includes or is communicably coupled to a GPU. As described below, the appliance VM can perform the functions specified by the request and return data related to the performed functions to the VM 140a.

Figure 2:
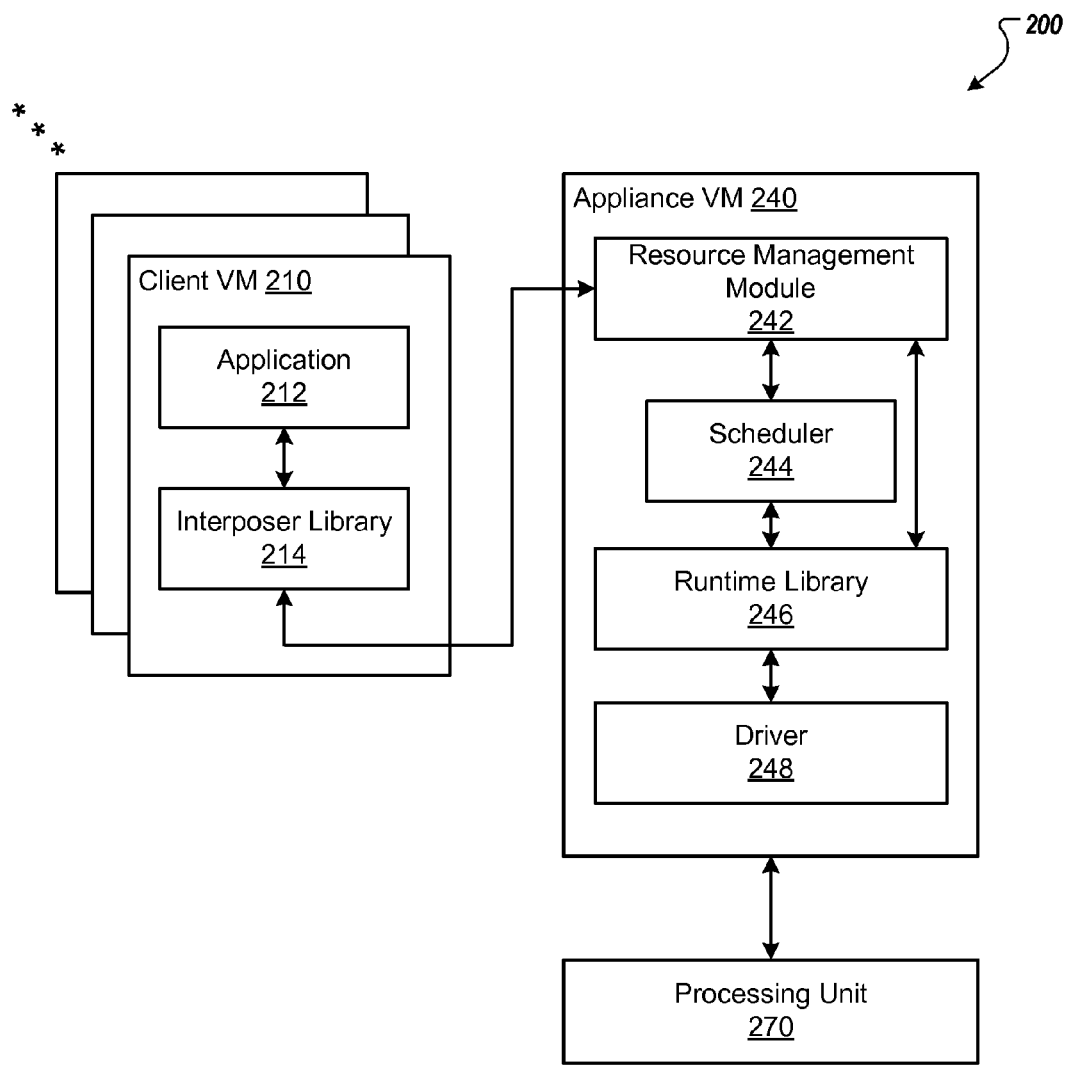
FIG. 2 shows an example environment in which an appliance VM executes operations of an application in response to requests from a client VM.

FIG. 2 shows an example environment 200 in which an appliance VM 240 executes functions of an application in response to requests from a client VM 210. The appliance VM 240 can be communicably coupled to a processing unit 270 that executes instructions provided by the appliance VM 240. Generally, an appliance VM is a VM that performs functions for other VMs. The appliance VM 240 may include a driver 248 that enables two-way communication between the appliance VM 240 and the processing unit 270. In some implementations, the driver 248 and/or a hypervisor managing the execution of the appliance VM 240 provides a direct pass-through communication path between the appliance VM 240 and the processing unit 270.

The processing unit 270 may execute instructions for one or more programming platforms. For example, the processing unit 270 may be a graphics processing unit that executes instructions for a particular programming platform, e.g., a CUDA programming platform. Software for the programming platform may be installed on the appliance VM 240 so that the appliance VM 240 can interact with the processing unit 270 to execute the instructions for the programming platform. The appliance VM 240 can include a runtime library 246 for the programming platform. The runtime library 246 can include functions, routines, and/or other operations that can be called by an application created for the programming platform. For example, the runtime library 246 may include a standard set of functions, e.g., including standard API calls, for the programming platform. In an example CUDA implementation, the runtime library 246 may include a CUDA library that includes CUDA functions, and the driver 248 may include a CUDA driver that enables the appliance VM 240 to communicate with a graphics processing unit.

The runtime library 246 may also include a custom library that includes one or more custom functions, as described in more detail below. For example, the runtime library may include a standard library for the programming platform, e.g., a standard CUDA library, and/or a custom library that includes one or more custom functions and, optionally, one or more standard functions for the programming platform.

The appliance VM 240 also includes a resource management module 242 and a scheduler 244 that enable the appliance VM 240 to perform functions for one or more client VMs 210. For example, each client VM 210 may execute an application that includes instructions for execution by the processing unit 270. The resource management module 242 can receive from the client VMs 210 requests to perform the functions and return data related to the performed functions to the client VMs 210. In some implementations, the resource management module 242 is, or includes, a server daemon. As described in more detail below, the resource management module 242 can also receive and modify the binary of applications' executable files so that user-created or other custom code of the applications can be executed by the appliance VM 240, e.g., without recompiling the application. The modifications also allow the application 212 to be paused by the appliance VM between the execution of functions requested by the client VM 210.

The scheduler 244 manages the use of the processing unit 270 such that each client VM 210 receives appropriate use of the processing unit 270. For example, the scheduler 244 may schedule the requested functions based on priority, current load, and/or previous use of the processing unit 270 by the client VMs 210. In some implementations, the appliance VM 240 includes multiple schedulers 244. For example, the appliance VM 240 may be communicably coupled to multiple processing units 270. The appliance VM 270 can include a scheduler 244 for each processing unit 270, or a scheduler 244 for subsets of processing units 270, e.g., one scheduler for every two processing units.

In response to receiving a request to perform a function, the resource management module 242 unpacks the information in the request, e.g., data specifying the function and/or data for use in performing the function, and forwards the unpacked information to the scheduler 244. In turn, the scheduler 244 forwards the unpacked information to the runtime library 246 and the driver 248, which interact with the processing unit 270 to perform the function. When the function is performed, the driver 248 and runtime library 246 sends data relating to the performed function, e.g., an output of the function, to the resource management module 242. The resource management module 242 sends the data related to the performed function to the client VM 210 that requested the performance of the function.

Each client VM 210 can include an application 212 that is executed by the client VM 210 and an interposer library 214 that is executed by the client VM 210. The client VM 210 may execute the application, in part, using a processor of a physical machine on which the VM 210 is being hosted. For example, the application 212 may include instructions that are to be executed by the processor of the physical machine, e.g., instructions to present data on a display. The application 212 may also include instructions that are to be executed by the processing unit 270. In a CUDA implementation, the processing unit 270 may be a GPU and the application 212 may include calls to CUDA functions that are executed by the GPU. As the client VMs 210 may not be communicably coupled to the processing unit 270 or to any processing units capable of executing the instructions to be executed by the processing unit 270, the client VM 210 may send requests to the appliance VM 240 to perform the functions that are to be executed by the processing unit 270.

While a client VM 210 is executing an application 212, the interposer library 214 can intercept function calls made by the application 212 that are to be executed by the processing unit 270 and interact with the appliance VM 240 to execute the called functions. For example, the interposer library 214 may detect calls made by the application 212 that are for the same type of processing unit as the processing unit 270. In a CUDA implementation, the interposer library 214 may detect CUDA API calls made by the application 212 for execution by a GPU.

In response to detecting a function call for the processing unit 270, the interposer library 214 collects data regarding the function call and packetizes the data for transmission to the appliance VM 240. This data can include, for example, data specifying the function call and data related to the function call, e.g., parameters or other inputs to be used when performing the function call. The interposer library 214 sends the packetized data to the resource management module 242. After the appliance VM 240 performs the requested function, the resource management module 242 sends data related to the performed function, e.g., outputs, to the interposer library 214. In turn, the interposer library 214 provides the data to the application 212.

Although the components of FIG. 2 are illustrated as being part of the client VM 210 or the appliance VM 240, one or more of the components may execute in a hypervisor or physical machine on which the corresponding VM is executed. For example, the driver 248 may be part of a hypervisor that manages the execution of the appliance VM 240. In addition, the client VM and the appliance VM 240 may be executed on the same physical machine using the same or different hypervisors. Or, the client VM 210 may be executed on a physical machine that is different from the physical machine on which the appliance VM 240 is executed.

Figure 3:
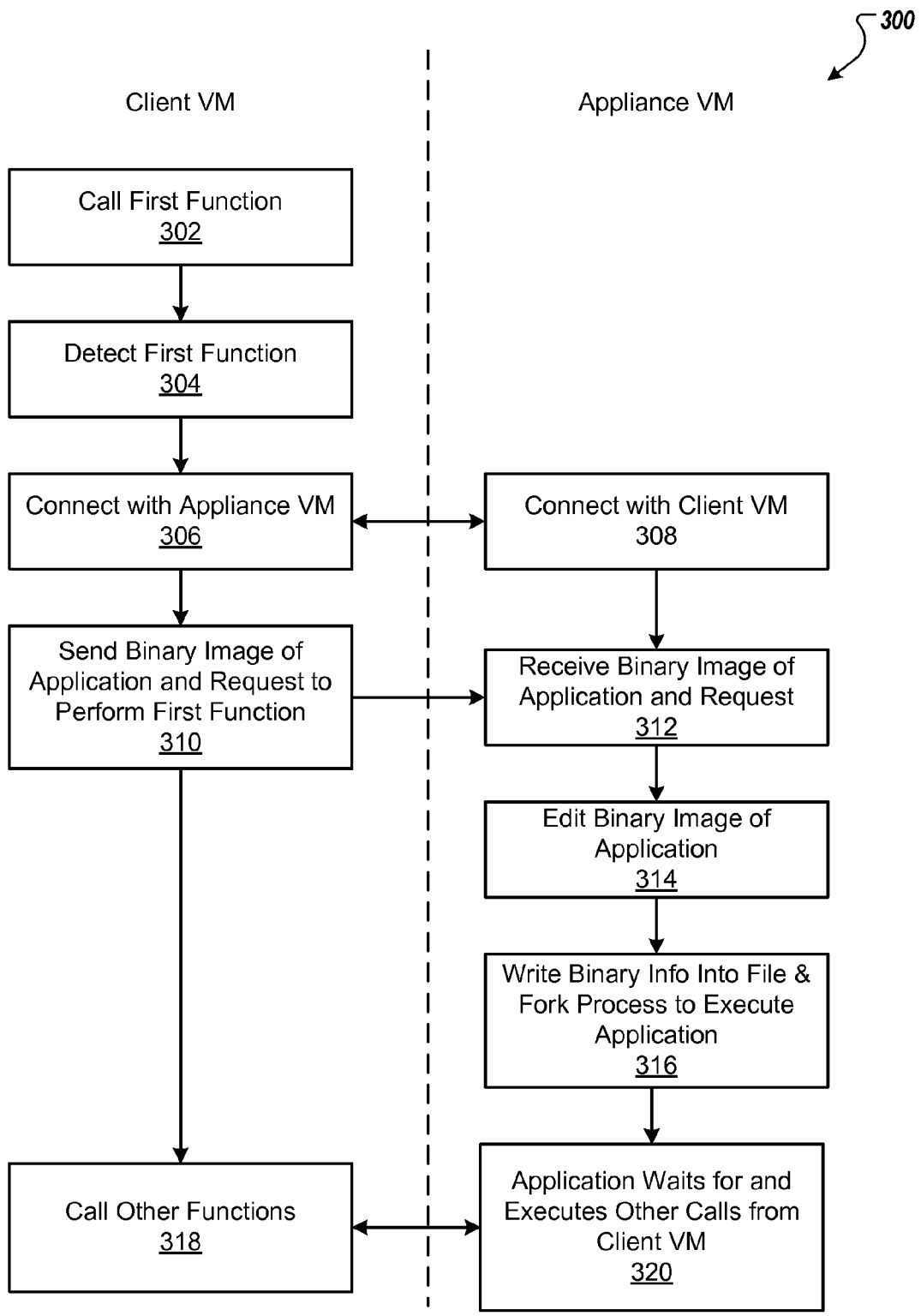
FIG. 3 is a flow chart of an example technique for executing operations of an application at an appliance VM.

FIG. 3 is a flow chart of an example technique 300 for executing functions of an application at an appliance VM. The example technique 300 is performed by a system of one or more computers. For example, the technique 300 may be performed by one or more physical machines that manage the execution of a client VM, e.g., the client VM 210, and an appliance VM, e.g., the appliance VM 240 of the environment 200 of FIG. 2. The client VM 210 and the appliance VM 240 may execute on the same physical machine or the client VM 210 may execute on a physical machine that is different from the physical machine on which the appliance VM 240 executes.

At block 302, the system calls a first function to be executed by a processing unit, e.g., the processing unit 270 of FIG. 2. For example, an application, e.g., application 212 of FIG. 2, being executed by the client VM 210 may call a first function for execution by the processing unit 270. The application 212 may include one or more function calls, e.g., API calls, for execution by the processing unit 270. The application 212 may also include function calls or other instructions that are executed by a processor of a physical machine on which the client VM 210 is executing.

At block 304, the system detects the first function call for the processing unit 270. For example, an interposer library, e.g., interposer library 214 of FIG. 2, detects the function call for the first function as a function to be performed by the processing unit 270. The interposer library 214 may detect the first function when it is called by the application 212.

At block 306, the system establishes a communication connection between the client VM 210 and the appliance VM 240. For example, the client VM 210 establishes a communication connection with the appliance VM 240 in response to detecting the first function for the processing unit 270. In some implementations, the client VM 210 establishes a TCP/IP (Transmission Control Protocol/Internet Protocol) connection with the appliance VM 240. In some implementations, the communication connection is a virtual remote direct memory access (vRDMA) connection. In some implementations, particularly in those implementations where the client VM is residing on the same physical host as the appliance VM, the communication connection may be a Virtual Machine Communication Interface (VMCI) connection. Other appropriate communication protocols for VMs can also be used.

At block 308, the appliance VM 240 confirms the communication connection by establishing the communication connection on its end.

At block 310, the system sends a binary image of the application's executable to the appliance VM 240. For example, the client VM 210 may send the binary image of the application's executable, e.g., in the form of a binary file or the executable file itself, to the appliance VM 240 in response to detecting the first function for the processing unit 270. The binary image of the application 212 may be sent to the appliance VM 240 so that the appliance VM 240 has access to any custom or user-created code fragments that are not included in the standard runtime library for the programming platform for which the processing unit 270 executes instructions. The client VM 210 may send the binary image using the established communication connection. At block 314, the appliance VM 240 receives the binary image or file.

The client VM 210 may also send data related to the first function to the appliance VM 240. For example, the interposer library 214, or another component, may collect data related to the first function. This data may include data specifying the first function, e.g., the name of the function or API, and data to be used in performing the function, e.g., input parameters or other data. The interposer library 214 can configure the data for transmission to the resource management module 242. For example, the interposer library 214 may packetize the data and send the packetized data to the resource management module 242.

At block 312, the appliance VM 240 receives the binary image and the data related to the first function from the client VM 210.

In some implementations, the client VM 210 may send the data related to the first function after sending the binary image of the application 212. For example, the client VM 210 may wait until the appliance VM 240 has modified the binary image, as described below, and has indicated that it is ready to receive requests to perform functions of the application 212 for the client VM 210 using the processing unit 270. In response to receiving the indication, the client VM 210 may send a request that includes the data related to the first function to the resource management module 242.

At block 314, the system edits the binary image of the application 212, e.g., so that the appliance VM 240 can perform functions for the application 212 without recompiling the application 212. For example, the resource management module 242 may edit the binary image of the application 212 so that the appliance VM 240 can perform custom or user-created functions for the application 212 without recompiling the application 212. In some implementations, the binary image is modified so that the application 212 is paused after the application is initialized at the appliance VM 240 and/or paused between each function call of the application 212 performed by the appliance VM 240. For example, rather than the appliance VM 240 executing the application 212 in parallel with the client VM 210, the appliance VM 240 may initialize the application 212 and pause the application 212 to wait for requests to perform functions of the application 212. When a request is received, e.g., from the client VM 210, the appliance VM 240 can perform the function of the request using the processing unit 270, return data related to the function to the client VM 210, and pause the application 212 at the appliance VM 240 until another request is received.

In some implementations, the resource management module 242 modifies the binary image of the application 212 so that a custom runtime library is loaded into memory when the application 212 is initialized at the appliance VM 240. For example, the resource management module 242 may identify a reference to the standard runtime library in a dynamic linking information segment of the binary image of the application. The resource management module 242 may modify the reference to the standard runtime library to reference the custom library instead. The custom library may be loaded into memory along with a standard runtime library for the programming platform for the processing unit 270 or in place of the standard runtime library. For example, the custom runtime library may include the standard functions, routines, and operations of the standard runtime library and one or more custom functions, routines, and/or operations.

The custom library may include a custom function that pauses the application 212 when the application is initialized and/or between each function of the application 212. The binary image may also be modified so that this custom function is called when the application 212 is initialized. For example, a jump or call to the custom function may be added to the main function of the application's binary image.

The binary image may also be modified to change the API call for the programming platform to a call to the custom function. For example, the name of the API call may be changed to the name of the custom function in one or more symbol tables of the binary image of the application 212, e.g., in a dynamic symbol table and/or a static symbol table of the binary image. The API call for which the name is replaced may be implemented in the custom library so that execution of the modified application is not affected by the change.

At block 316, the system writes the modified binary to a file and forks a process to execute the modified application. For example, the resource management module 242 may write the modified binary to a file and fork a process to execute the modified application. The appliance VM 240 initializes the modified application. When the modified application is initialized, the custom function is called, for example as the first called function, and the modified application is paused to wait for a request to perform a function of the application.

If the appliance VM 240 has already received the data related to the first function of the application 212 for execution by the processing unit 270, the appliance VM 240 may perform the first function, return data related to the performed function to the client VM 210, and enter the paused state to wait for additional functions to perform. In some implementations, the appliance VM 240 may send to the client VM 210 data indicating that the appliance VM 240 is ready to receive requests. The client VM 210 may then send to the resource management module 242 a request that includes data related to the first function. The appliance VM 240 may unpack the data, execute the first function using the processing unit 270, and enter the paused state to wait for additional requests.

At block 318, the system calls other functions that are to be executed by the processing unit 270. For example, the application 212 executing on the client VM 210 may call other functions that are to be executed by the processing unit 270. For example, the interposer library 214 may identify a second (or other subsequent) function to be performed by the processing unit 270. In response, the interposer library 214 may collect data related to the second function, package the data, and send the data to the resource management module 242 for execution by the processing unit 270.

At block 320, the appliance VM 240 receives the data and executes the second function. The resource management module 242 may unpack the received data and send the unpacked data to the scheduler 244 and the runtime library 246. In turn, the scheduler 244 may place the function in a queue of functions to be executed by the processing unit 270. When the scheduler 240 is ready to perform the second function, the runtime library 246, which may include custom and user-created functions as well as standard functions for the programming platform, may identify the function to be performed and interact with the driver 248 and processing unit 270 to perform the function. When the function is performed, the driver 248 can send data related to the performed function to the resource management module 242. In turn, the resource management module 242 sends the data related to the performed function to the client VM 210.

In some implementations, the programming platform executes custom user-created code fragments by passing a pointer (or data identifying a pointer) to the code fragment in an API call (or other function call). In such implementations, the interposer library 214 may identify the API call and send data identifying the API call to the resource management module 242. The API call can then be used by the standard runtime library 246 and the driver 248 to identify the code fragment in memory to be executed by the processing unit 270. After the code fragment is identified, the driver 248 can interact with the processing unit 270 to execute the code fragment.

After the function is performed, the modified application returns to the paused state until another request is received. For example, the application may re-execute the custom function after the execution of each function to return to the paused state.

Figure 4:
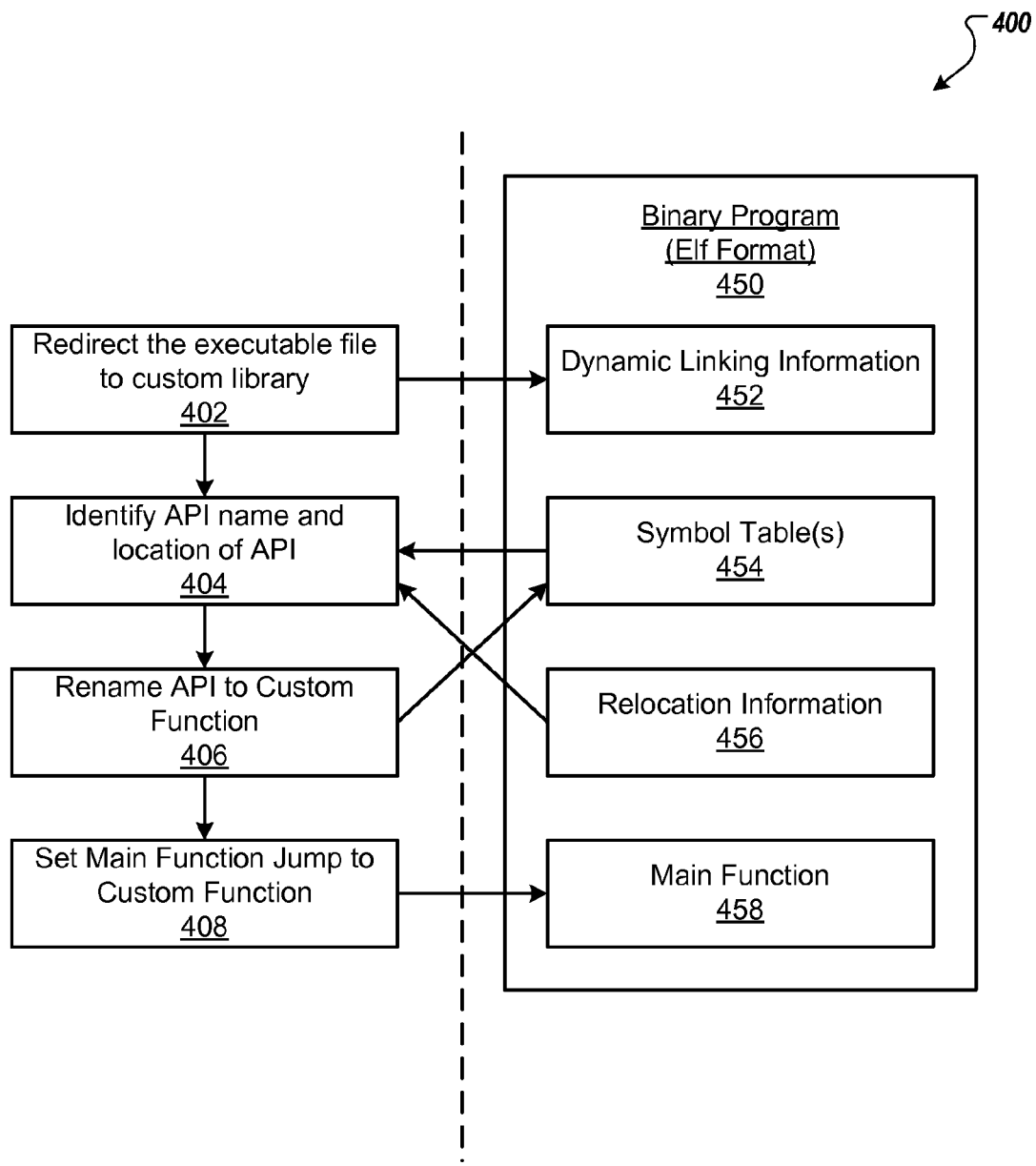
FIG. 4 is a flow chart of an example technique for editing the binary of an executable file for an application.

FIG. 4 is a flow chart of an example technique 400 for editing the binary of an executable file 450 for an application. The example technique 400 is performed by a system of one or more computers. For example, the technique 400 may be performed by one or more physical machines that manage the execution of a client VM, e.g., the client VM 210, and an appliance VM, e.g., the appliance VM 240 of the environment 200 of FIG. 2. The client VM 210 and the appliance VM 240 may execute on the same physical machine or the client VM 210 may execute on a physical machine that is different from the physical machine on which the appliance VM 240 executes. In this example, the executable file is in the Executable and Linkable (ELF) format.

At block 402, the system edits the binary image of the executable file 450 so that a custom library, e.g., a custom runtime library, will be loaded into memory in place of a standard library, e.g., a standard runtime library, for the processing unit 270. In some implementations, the binary image is edited by replacing, in dynamic linking information 452 of the binary, a string that identifies the standard library with a string that identifies the custom library. For example, if the programming platform is CUDA, the resource management module 242 may identify the string "libcudart.so" and replace it with a string that identifies the custom library. With this replacement, both libraries may be loaded into memory at runtime for the modified binary to invoke the functions of both libraries when the binary executes.

At block 404, the system identifies the API name for the programming platform in one or more symbol tables 454 of the binary. For example, the resource management module 242 may identify a reference to the API name for the programming platform in a dynamic symbol table of the binary and/or in a static table of the binary. The resource management module 242 also identifies relocation information 456 for the API in relocation information for the binary. The resource management module 242 then replaces, in the string whose position is identified by information of the API in the symbol table(s) and/or in the relocation information, the name of the API with the name of a custom function that initializes the modified application in a paused state and returns the application to the paused state after functions are performed by the processing unit 270. The system may also make, in the main function, an indirect jump to the custom function using the relocation information for the API.

At block 406, the system modifies a main function 458 of the binary to set the main function to the custom function. For example, the resource management module 242 modifies the main function 458 of the binary to set the main function jump to the custom function. This causes the custom function to be executed when the modified application is initialized in the appliance VM 240. When the custom function is executed, the custom function causes the modified application to start and then pause to wait for requests from the client VM 210 to perform functions of the application 212 executing on the client VM 210.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a virtual machine, a request to perform an initial function of an application and an executable file for the application, the application including one or more instructions for a particular programming platform;
   modifying, by the virtual machine, the executable file by:
      redirecting the executable file to a custom runtime library that is different from a standard runtime library for the particular programming platform, the custom runtime library including a custom function configured to initialize the application and to place the application in a paused state, wherein the redirecting includes editing the executable file to replace dynamic linking information identifying the standard runtime library with a reference to the custom runtime library; and
      adding, in the executable file, a custom function call to the custom function; and
   initializing, by the virtual machine, the application by executing the modified executable file, the executing causing the custom function to initialize the application and place the application in a paused state whereby the application waits for data specifying one or more additional functions of the application to perform using the particular programming platform.

2. The method of claim 1, wherein initializing the application comprises:
   performing the initial function using the particular programming platform; and
   pausing the application after the initial function has been performed.

3. The method of claim 2, wherein performing the initial function comprises the virtual machine interacting with a hardware processing unit that is configured to execute function calls for the particular programming platform.

4. The method of claim 3, wherein the hardware processing unit comprises a graphics processing unit (GPU) and wherein the particular programming platform is Compute Unified Device Architecture (CUDA).

5. The method of claim 2, further comprising:
   receiving, by the virtual machine, data specifying a second function of the application to be performed;
   performing, by the virtual machine, the second function using the particular programming platform;
   providing, by the virtual machine, data related to the performed second function; and
   returning, by the virtual machine, the application to the paused state.

6. The method of claim 1, wherein redirecting the executable file to a custom runtime library that is different from a standard runtime library for the particular programming platform comprises:
   identifying, in a dynamic linking information segment of the executable file, a reference to a standard runtime library for the particular programming platform; and
   modifying the reference to the standard runtime library to reference the custom runtime library.

7. The method of claim 1, wherein modifying the executable file comprises:
   identifying, in one or more symbol tables of the executable file, a reference to an application programming interface (API) function of the standard runtime library for the particular programming platform;
   modifying, in the one or more symbol tables, the reference to the API function to reference the custom function;
   identifying, in one or more relocation sections of the executable file, relocation information of the API function; and
   modifying a main function of the executable file to replace binary code of the main function by a function call to the custom function using the relocation information of the API function.

8. The method of claim 1, wherein the received application includes at least one segment of user-created code that is different from standard API calls for the particular programming platform.

9. The method of claim 1, wherein
   the virtual machine receives the request and the executable file from a second virtual machine; and wherein
   the second virtual machine:
      executes the application;
      identifies functions calls of the application that are for the particular programming platform; and
      provides data specifying the identified function calls to the virtual machine in response to identifying the identified function calls.

10. The method of claim 9, wherein the second virtual machine comprises a client virtual machine and the virtual machine comprises an appliance virtual machine.

11. The method of claim 1, wherein the virtual machine:
modifies, for each of a plurality of virtual machines, a respective second application that includes instructions that specify functions for the particular programming platform; and
performs functions related to each second application that are requested by the plurality of virtual machines.

12. The method of claim 1, wherein the particular programming platform comprises a Compute Unified Device Architecture (CUDA) programming platform.

13. The method of claim 1, wherein the modified executable file performs the custom function without recompiling the application.

14. A system comprising:
data processing apparatus having one or more programmable processors programmed to perform operations comprising:
receiving, by a virtual machine executing on the data processing apparatus, an executable file for the application, the application including one or more instructions for a particular programming platform;
modifying the executable file by:
redirecting the executable file to a custom runtime library that is different from a standard runtime library for the particular programming platform, the custom runtime library including a custom function configured to initialize the application and to place the application in a paused state, wherein the redirecting includes editing the executable file to replace dynamic linking information identifying the standard runtime library with a reference to the custom runtime library; and
adding, in the executable file, a custom function call to the custom function; and
initializing the application by executing the modified executable file, the executing causing the custom function to initialize the application and place the application in a paused state whereby the application waits for data specifying one or more additional functions of the application to perform using the particular programming platform.

15. The system of claim 14, wherein initializing the application comprises:
receiving a request to perform an initial function of the application using the particular programming platform;
performing the initial function using the particular programming platform; and
pausing the application after the initial function has been performed.

16. The system of claim 15, wherein performing the initial function comprises the virtual machine interacting with a hardware processing unit that is configured to execute function calls for the particular programming platform.

17. The system of claim 16, wherein the hardware processing unit comprises a graphics processing unit (GPU) and wherein the particular programming platform is Compute Unified Device Architecture (CUDA).

18. The system of claim 14, wherein redirecting the executable file to a custom runtime library that is different from a standard runtime library for the particular programming platform comprises:

identifying, in a dynamic linking information segment of the executable file, a reference to a standard runtime library for the particular programming platform; and
modifying the reference to the standard runtime library to reference the custom runtime library.

19. The system of claim 14, wherein modifying the executable file comprises:
identifying, in one or more symbol tables of the executable file, a reference to an application programming interface (API) function of the standard runtime library for the particular programming platform;
modifying, in the one or more symbol tables, the reference to the API function to reference the custom function;
identifying, in one or more relocation sections of the executable file, relocation information of the API function; and
modifying a main function of the executable file to replace binary code of the main function by a function call to the custom function using the relocation information of the API function.

20. The system of claim 14, wherein
the virtual machine receives the request and the executable file from a second virtual machine; and wherein
the second virtual machine:
executes the application;
identifies functions calls of the application that are for the particular programming platform; and
provides data specifying the identified function calls to the virtual machine in response to identifying the identified function calls.

21. A non-transitory machine readable storage medium embodying computer software, the computer software causing a computer to perform a method, the method comprising:
receiving, by a virtual machine, a request to perform an initial function of an application and an executable file for the application, the application including one or more instructions for a particular programming platform;
modifying, by the virtual machine, the executable file by:
redirecting the executable file to a custom runtime library that is different from a standard runtime library for the particular programming platform, the custom runtime library including a custom function configured to initialize the application and to place the application in a paused state, wherein the redirecting includes editing the executable file to replace dynamic linking information identifying the standard runtime library with a reference to the custom runtime library; and
adding, in the executable file, a custom function call to the custom function; and
initializing, by the virtual machine, the application by executing the modified executable file, the executing causing the custom function to initialize the application and place the application in a paused state whereby the application waits for data specifying one or more additional functions of the application to perform using the particular programming platform.

* * * * *